(12) United States Patent
Watanabe et al.

(10) Patent No.: US 10,372,949 B2
(45) Date of Patent: Aug. 6, 2019

(54) CONTROL DEVICE AND PRINTING APPARATUS

(71) Applicant: FUJI XEROX CO., LTD., Tokyo (JP)

(72) Inventors: Satoshi Watanabe, Yokohama (JP); Yusaku Kurihara, Yokohama (JP); Tsubasa Kitai, Yokohama (JP); Noriaki Tanaka, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 186 days.

(21) Appl. No.: 15/243,563

(22) Filed: Aug. 22, 2016

(65) Prior Publication Data

US 2017/0277918 A1 Sep. 28, 2017

(30) Foreign Application Priority Data

Mar. 24, 2016 (JP) .................................. 2016-060835

(51) Int. Cl.
  *G06F 21/84* (2013.01)
  *G06F 21/60* (2013.01)
  *G06K 15/00* (2006.01)

(52) U.S. Cl.
  CPC ............ *G06F 21/84* (2013.01); *G06F 21/608* (2013.01); *G06K 15/40* (2013.01)

(58) Field of Classification Search
  CPC ........ G06F 21/84; G06F 21/608; G06K 15/40
  See application file for complete search history.

(56) References Cited

U.S. PATENT DOCUMENTS

| 5,066,977 | A | * | 11/1991 | Yoshizuka | G03G 15/50 377/16 |
| 6,674,545 | B1 | * | 1/2004 | Atsumi | G03G 15/50 358/1.14 |
| 9,245,500 | B1 | * | 1/2016 | Zhang | G09G 5/377 |
| 2002/0063878 | A1 | * | 5/2002 | Nakagiri | G06F 3/1211 358/1.13 |
| 2004/0125407 | A1 | * | 7/2004 | Nishikawa | G06F 21/608 358/1.18 |
| 2004/0156645 | A1 | * | 8/2004 | Nakazato | G03G 15/0849 399/27 |
| 2008/0094657 | A1 | * | 4/2008 | Ikegami | G06F 21/608 358/1.15 |

(Continued)

FOREIGN PATENT DOCUMENTS

JP 2007-034701 A 2/2007
JP 2007-299265 A 11/2007

*Primary Examiner* — Joseph P Hirl
*Assistant Examiner* — J. Brant Murphy
(74) *Attorney, Agent, or Firm* — Oliff PLC

(57) ABSTRACT

A control device includes a prohibition unit that prohibits use of an electronic apparatus in a case where a sum of a cumulative amount of use of the electronic apparatus for a predetermined period of time and a new amount of use which is newly instructed by an user exceeds a permitted amount in the period of time which is permitted for the user, and a permission unit that permits use of the electronic apparatus by an amount based on an unused amount which is a difference between the permitted amount and the cumulative amount of use in an unreaching period when the unreaching period is present before the period of time in an accounting period including the period of time, in a case where the use of the electronic apparatus is prohibited by the prohibition unit.

13 Claims, 3 Drawing Sheets

(56) References Cited

U.S. PATENT DOCUMENTS

| | | | |
|---|---|---|---|
| 2009/0059273 A1* | 3/2009 | Tomita | H04N 1/00204 358/1.15 |
| 2009/0086264 A1* | 4/2009 | Yoshida | H04N 1/00222 358/1.15 |
| 2011/0067026 A1* | 3/2011 | Nishio | G06F 21/31 718/100 |
| 2012/0051764 A1* | 3/2012 | Kurita | G03G 15/6564 399/38 |
| 2015/0222775 A1* | 8/2015 | Adachi | H04N 1/00082 358/1.6 |

* cited by examiner

| MONTH | 1 | 2 | 3 | 4 | 5 | 6 | 7 | 8 | 9 | 10 | 11 | 12 |
|---|---|---|---|---|---|---|---|---|---|---|---|---|
| UNUSED AMOUNT | 0 | 64 | 0 | 0 | 98 | 0 | 36 | 0 | 0 | 123 | 76 | 0 |

*FIG. 4*

THE NUMBER OF PRINTED
SHEETS OF THIS MONTH
HAS EXCEEDED UPPER LIMIT.
PLEASE BE CAREFUL.

RETURN

CONTROL DEVICE AND PRINTING APPARATUS

CROSS-REFERENCE TO RELATED APPLICATIONS

This application is based on and claims priority under 35 USC 119 from Japanese Patent Application No. 2016-060835 filed Mar. 24, 2016.

BACKGROUND

Technical Field

The present invention relates to a control device and a printing apparatus.

SUMMARY

An aspect of the invention provides a control device including:

a prohibition unit that prohibits use of an electronic apparatus performed by a user in a case where a sum of a cumulative amount of use of the electronic apparatus performed by the user for a predetermined period of time and a new amount of use which is newly instructed by the user exceeds a permitted amount in the period of time which is permitted for the user; and a permission unit that permits use of the electronic apparatus by an amount based on an unused amount which is a difference between the permitted amount and the cumulative amount of use in an unreaching period for which the cumulative amount of use does not reach the permitted amount when the unreaching period is present before the period of time in an accounting period including the period of time, in a case where the user's use of the electronic apparatus is prohibited by the prohibition unit.

BRIEF DESCRIPTION OF THE DRAWINGS

Exemplary embodiments of the present invention will be described in detail based on the following figures, wherein:

FIG. 4 is a diagram showing a notification screen.

DETAILED DESCRIPTION

Figures 1, 2:
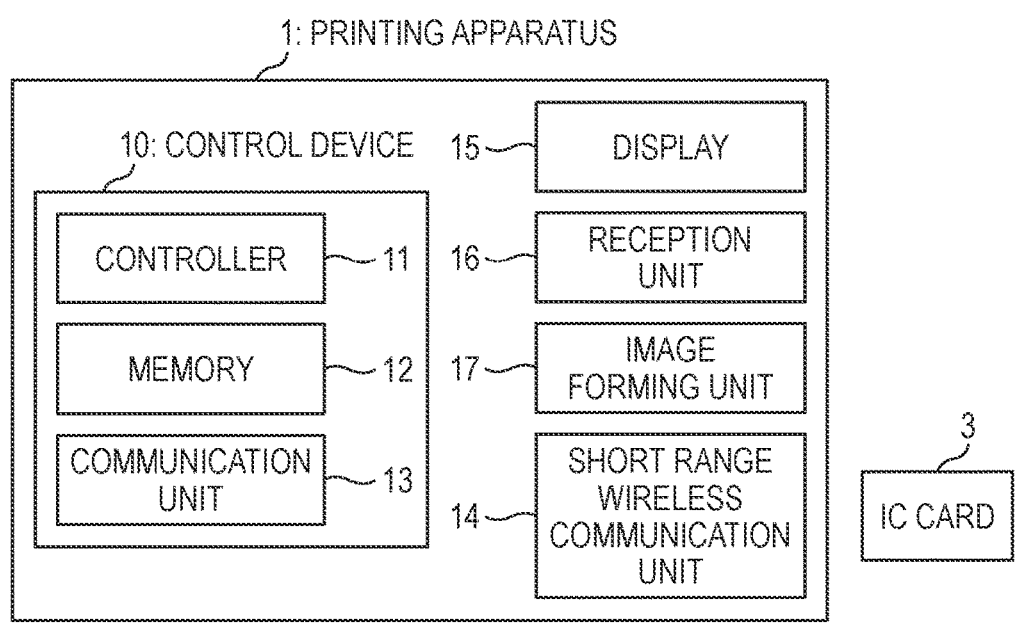
FIG. 1 is a diagram showing a hardware configuration of a printing apparatus.
FIG. 2 is a diagram showing an unused amount table.

An example of a mode for implementing the invention will be described. FIG. 1 is a diagram showing a hardware configuration of a printing apparatus 1. The printing apparatus 1 is an example of electronic apparatus according to the invention. The printing apparatus 1 prints out an image based on printing data. A control device 10 includes a controller 11, a memory 12, and a communication unit 13, and controls the printing apparatus 1. The control device 10 may be configured as an external device of the printing apparatus 1, and the control device 10 and the printing apparatus 1 may be configured to communicate with each other through a communication unit.

The controller 11 includes an arithmetic operation device such as a Central Processing Unit (CPU) and a storage device such as a Read Only Memory (ROM) or a Random Access Memory (RAM). The ROM stores firmware in which the procedure of the start-up of hardware or an Operating System (OS) is described. The RAM stores data when the CPU executes an arithmetic operation. The memory 12 includes, for example, a hard disk storage device, and stores an OS, application programs, and the like. The communication unit 13 is a communication interface (I/F) for connecting the printing apparatus 1 to a Local Area Network (LAN).

The short range wireless communication unit 14 is a reader-writer that performs communication with, for example, a non-contact type integrated circuit (IC) card 3. The IC card 3 stores a user ID that identifies a user account of the printing apparatus 1. The short range wireless communication unit 14 periodically transmits an inquiry signal.

When an operator holds up the IC card 3 over the printing apparatus 1, the IC card 3 receives the inquiry signal.

The IC card 3 transmits a user ID to the short range wireless communication unit 14 in response to the reception of the inquiry signal. A user ID of a user given the user account of the printing apparatus 1 is stored in the memory 12 in advance. The controller 11 permits the use of the printing apparatus 1 in a case where the user ID received by the short range wireless communication unit 14 is stored in the memory 12.

In general, there are a case where an individual uses one user ID and a case where plural individuals included in a group share one user ID, but a user in the following description is a unit that manages the amount of use of the printing apparatus 1 and means an individual or a group which is associated with the user ID. On the other hand, a person who operates the printing apparatus 1 is referred to as an operator.

The display 15 is, for example, a liquid crystal display, and displays a screen for operating the printing apparatus 1. The reception unit 16 is, for example, a touch panel provided so as to cover a display surface of the display 15, and receives an operation with respect to the printing apparatus 1.

The image forming unit 17 forms an image on a recording medium based on raster data. The recording medium is, for example, a printing sheet (hereinafter, referred to as a sheet). The configuration of the image forming unit 17 may be any configuration such as an electrophotographic system or an inkjet system. The memory 12 stores a cumulative amount of use indicating the number of sheets used for printing. The controller 11 adds the number of sheets used for printing to a cumulative amount of use every time printing is performed. In addition, the controller 11 initializes a cumulative amount of use to zero at a point in time when a month in a calendar changes. In other words, the cumulative amount of use is the number of sheets printed this month.

FIG. 2 is a diagram showing an unused amount table. The unused amount table is a table that stores an unused amount in each period for each user ID. The wording "unused amount" as used herein refers to an amount obtained by subtracting a cumulative amount of use from a permitted amount. The wording "permitted amount" as used herein refers to the number of sheets permitted to be printed. In this example, the length of a period of time is one month. A period of time (period of time for which an unused amount is not zero) for which a cumulative amount of use does not reach a permitted amount will be referred to as an unreaching period.

Figure 3:
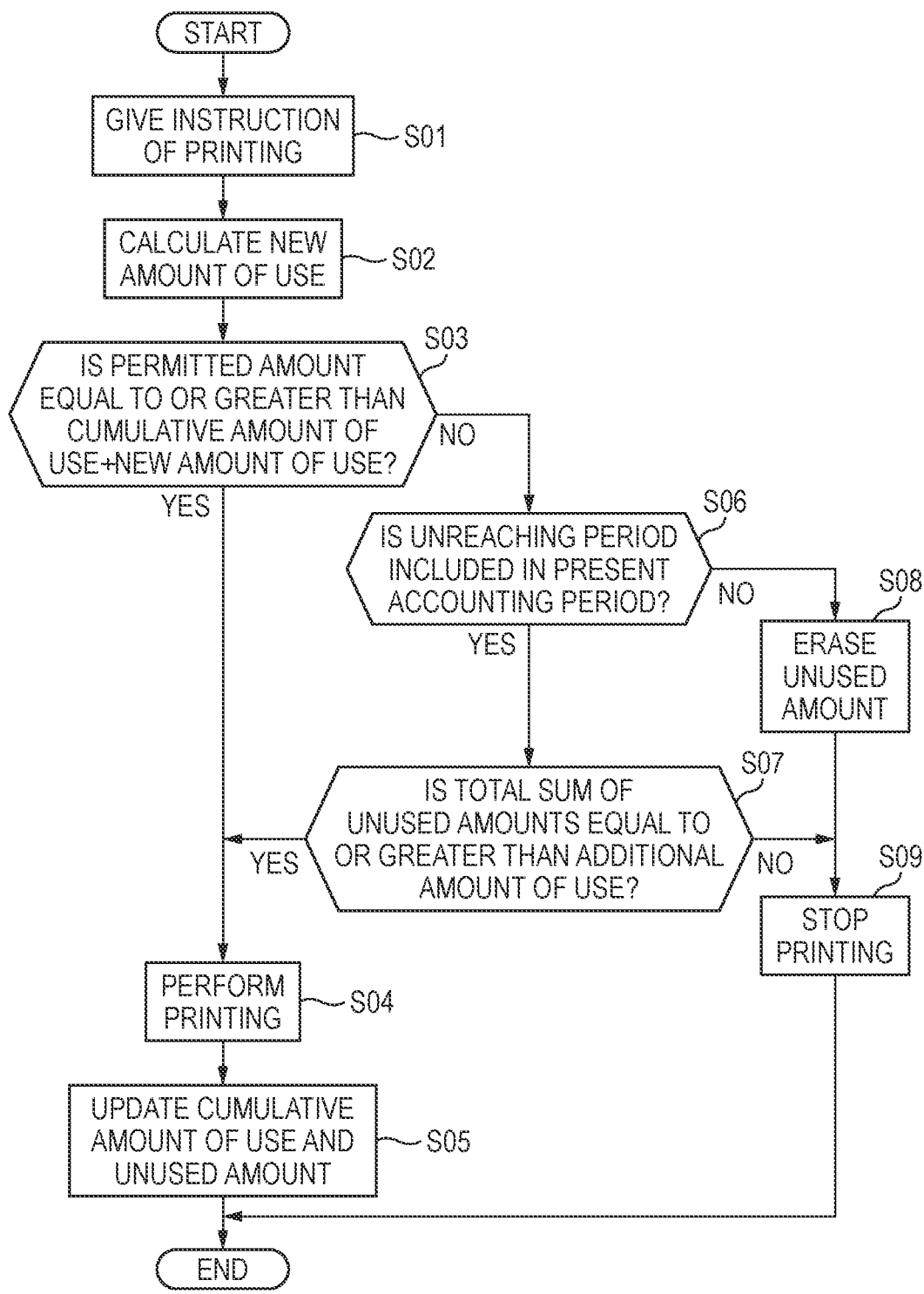
FIG. 3 is a flow chart showing the procedure of a process according to an exemplary embodiment.

FIG. 3 is a flow chart showing the procedure of a process according to an exemplary embodiment. The controller 11 of the printing apparatus 1 performs the following process in accordance with an application program installed in the printing apparatus 1.

[Step S01]

The controller 11 receives a print instruction. For example, an operator gives an instruction for copying to the reception unit 16, and the instruction is output to the controller 11.

[Step S02]

The controller 11 calculates a new amount of use. Specifically, the controller 11 calculates the number of sheets used (new amount of use) based on the print instruction.

[Step S03]

The controller 11 reads out the cumulative amount of use from the memory 12, and determines whether or not the sum of the cumulative amount of use and the new amount of use is equal to or less than a permitted amount of this month. In a case where the sum of the cumulative amount of use and the new amount of use is equal to or less than the permitted amount of this month (step S03: YES), the process of the controller 11 proceeds to step S08. In a case where the sum of the cumulative amount of use and the new amount of use is not equal to or less than the permitted amount of this month (step S03: NO), the process of the controller 11 proceeds to step S06.

[Step S06]

The controller 11 determines whether or not the present accounting period includes an unreaching period. Specifically, the controller determines whether or not an unreaching period (period of time for which an unused amount is not zero) which is a period before this month is included in an accounting period including this month with reference to the unused amount table. In a case where an unreaching period is included (step S06: YES), the process of the controller 11 proceeds to step S07. In a case where an unreaching period is not included (step S06: NO), the process of the controller 11 proceeds to step S08. For example, the accounting period is set to a period from April to March, and an unreaching period (May, July, October, and November) is included in a period from April to November in the example of FIG. 2 assuming that this month is December.

[Step S07]

The controller 11 determines whether or not there is an unused amount capable of performing printing according to a print instruction. Specifically, the controller 11 calculates an additional amount of use by the following expression.

Additional Amount of Use=(Cumulative Amount of Use+New Amount of Use)−Permitted Amount of This Month Next, the controller 11 determines whether or not the total sum of unused amounts in the present accounting period (in this example, the total sum of unused amounts of May, July, October, and November) is equal to or greater than the additional amount of use. In a case where the total sum of the unused amounts is equal to or greater than the additional amount of use (step S07: YES), the process of the controller 11 proceeds to step S04. In a case where the total sum of the unused amounts is not equal to or greater than the additional amount of use (step S07: NO), the process of the controller 11 proceeds to step S09.

[Step S04]

The controller 11 outputs raster data based on a print instruction to the image forming unit 17 and executes printing.

[Step S05]

The controller 11 updates a cumulative amount of use and an unused amount. Specifically, the controller 11 adds a new amount of use to the cumulative amount of use. In addition, the controller 11 subtracts an additional amount of use from the unused amount. Here, in a case where there are plural unreaching periods, subtraction is performed from an unused amount in the oldest unreaching period, and subtraction is performed from an unused amount in the next oldest unreaching period in a case of insufficiency.

[Step S08]

The controller 11 erases an unused amount which is not included in the present accounting period from the unused amount table.

[Step S09]

The controller 11 stops the printing.

As described above, the printing apparatus according to this exemplary embodiment includes a prohibition unit and a permission unit.

The prohibition unit prohibits printing performed by a user in a case where the sum of a cumulative number of printed sheets of the user for a predetermined period of time and a new number of printed sheets which is newly instructed by the user exceeds a permitted number of sheets in the period of time which is permitted for the user.

The permission unit permits the printing of the number of sheets based on the number of unused sheets which is a difference between the permitted number of sheets and the cumulative number of printed sheets in an unreaching period for which the cumulative number of printed sheets does not reach the permitted number of sheets when the unreaching period is present before the period of time in an accounting period including the period of time, in a case where the printing performed by the user is prohibited by the prohibition unit. According to this exemplary embodiment, since the number of unused sheets in an accounting period in which the due date of sum of accounting has passed is not used in a case where the number of unused sheets in a period of time before the period of time is used in order to perform printing with a permitted number of sheets in the period of time, a problem of accounting management does not occur.

In addition, in this exemplary embodiment, the permission unit permits printing by an amount based on the number of unused sheets in all of the unreaching periods before the period of time in the accounting period including the period of time, in a case where printing performed by the user is prohibited by the prohibition unit. Accordingly, according to this exemplary embodiment, a use range of the number of unused sheets is maximized.

The above-described exemplary embodiment may be modified as in the following modification example. Plural modification examples may be combined with each other.

FIRST MODIFICATION EXAMPLE

FIG. 4 is a diagram showing a notification screen. In a case where the determination result in step S07 of the exemplary embodiment is YES, a message indicating that a cumulative amount of use of this month exceeds a permitted amount may be displayed on a display. This is because it is preferable to call a user's attention to the amount of use of the printing apparatus even when printing is performed by the use of an unused amount. This configuration is an example of a notification unit that gives notice that the cumulative amount of use of the electronic apparatus for the period of time exceeds the permitted amount in the period of time in a case where the use of the electronic apparatus is permitted by the permission unit.

SECOND MODIFICATION EXAMPLE

In step S07 of the exemplary embodiment, it may be determined whether or not an unused amount (in the example of FIG. 2, an unused amount of November) in an unreaching period immediately before this month in the present accounting period is equal to or greater than an additional amount of use. According to this configuration, since an unused amount to be used is suppressed as compared to a configuration which is not limited to an unreaching period immediately before this month, a user's attention to the amount of use of electronic apparatus is strengthened.

This configuration is an example of a configuration in which the permission unit permits the use of the electronic apparatus by an amount based on an unused amount in the unreaching period immediately before the period of time in an accounting period including the period of time, in a case where the user's use of the electronic apparatus is prohibited by the prohibition unit.

THIRD MODIFICATION EXAMPLE

In the determination in step S07 of the exemplary embodiment, an amount obtained by multiplying a coefficient less than 1 by the total sum of unused amounts may be used instead of the total sum of unused amounts. According to this configuration, since an unused amount to be used is suppressed as compared to a configuration in which a coefficient less than 1 is not multiplied, it is possible to strengthen a user's attention to the electronic apparatus.

Similarly, regarding the second modification example, an amount obtained by multiplying a coefficient less than 1 by an unused amount in an unreaching period immediately before this month may be used instead of an unused amount in an unreaching period immediately before this month. In other words, these configurations are examples of a configuration in which the permission unit permits the use of electronic apparatus by an amount obtained by multiplying a coefficient less than 1 by the unused amount.

FOURTH MODIFICATION EXAMPLE

As the amount of use, the number of pages may be used instead of the number of sheets.

A unit of a period of time may be any length of time such as a weekly unit or a daily unit.

FIFTH MODIFICATION EXAMPLE

In the exemplary embodiment, a description has been given of an example in which the invention is applied to the management of the amount of use (the number of printed sheets) of a printing apparatus, but the invention may be applied to the management of the amount of use of electronic apparatus other than the printing apparatus, such as the amount of use (the number of read sheets) of an image scanner or the amount of use (the number of transmitted sheets) of a facsimile. In other words, the invention provides a control device including a prohibition unit and a permission unit.

The prohibition unit prohibits the use of electronic apparatus performed by a user in a case where the sum of a cumulative amount of use of the electronic apparatus of the user for a predetermined period of time and a new amount of use which is newly instructed by the user exceeds a permitted amount in the period of time which is permitted for the user.

The permission unit permits the use of the electronic apparatus by an amount based on an unused amount which is a difference between the permitted amount and the cumulative amount of use in an unreaching period for which the cumulative amount of use does not reach the permitted amount when the unreaching period is present before the period of time in an accounting period including the period of time, in a case where the user's use of the electronic apparatus is prohibited by the prohibition unit.

In addition, the configuration of the control device may be modified to a configuration in which a prohibition unit is not included. The invention provides a control device including a permission unit.

The permission unit permits the use of electronic apparatus by an amount based on an unused amount which is a difference between a permitted amount and a cumulative amount of use in an unreaching period for which the cumulative amount of use does not reach the permitted amount when the unreaching period is present before the period of time in an accounting period including the period of time, in a case where the sum of the cumulative amount of use of the electronic apparatus of the user for a predetermined period of time and a new amount of use which is newly instructed by the user exceeds a permitted amount in the period of time which is permitted for the user.

SIXTH MODIFICATION EXAMPLE

In the exemplary embodiment, a description has been given of an example in which the above-mentioned functions are realized by an application program, but some or all of the above-mentioned functions may be mounted in a hardware circuit. In addition, the application program may be provided by being recorded in a computer readable recording medium such as an optical recording medium or a semiconductor memory, or the program may be read from the recording medium to be installed. In addition, the program may be provided by an electric communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
   a processor configured to:
      prohibit use of an electronic apparatus by a user in a case where, for a predetermined period of time included in an accounting period, a sum of a cumulative amount of use of the electronic apparatus by the user and a new amount of use of the electronic apparatus newly instructed by the user exceeds a permitted amount; and
      in a case where the user's use of the electronic apparatus would be otherwise prohibited, nonetheless permit use of the electronic apparatus by an amount based on an unused amount from an unreaching period that is before the predetermined period of time but included in the accounting period, the unreaching period being a period for which the cumulative amount of use does not reach the permitted amount, and the unused amount being a difference between the permitted amount in the unreaching period and the cumulative amount in the unreaching period.

2. The control device according to claim 1, wherein the processor is further configured to:
give notice that the cumulative amount of use of the electronic apparatus for the predetermined period of time exceeds the permitted amount for the predetermined period of time in a case where the use of the electronic apparatus is permitted.

3. The control device according to claim 2, wherein:
a plurality of the unreaching periods from before the predetermined period of time are present in the accounting period, and
in the case where the user's use of the electronic apparatus would be otherwise prohibited, the processor permits the use of the electronic apparatus by an amount based on the unused amounts from all of the plurality of the unreaching periods.

4. The control device according to claim 3, wherein the processor permits the use of the electronic apparatus by an amount obtained by multiplying a coefficient less than 1 by the unused amounts.

5. The control device according to claim 2, wherein:
a plurality of the unreaching periods from before the predetermined period of time are present in the accounting period, and
in the case where the user's use of the electronic apparatus would be otherwise prohibited, the processor permits the use of the electronic apparatus by an amount based on the unused amount from the unreaching period immediately before the predetermined period of time.

6. The control device according to claim 5, wherein the processor permits the use of the electronic apparatus by an amount obtained by multiplying a coefficient less than 1 by the unused amount.

7. The control device according to claim 1, wherein:
a plurality of the unreaching periods from before the predetermined period of time are present in the accounting period, and
in the case where the user's use of the electronic apparatus would be otherwise prohibited, the processor permits the use of the electronic apparatus by an amount based on the unused amounts from all of the plurality of the unreaching periods.

8. The control device according to claim 7, wherein the processor permits the use of the electronic apparatus by an amount obtained by multiplying a coefficient less than 1 by the unused amounts.

9. The control device according to claim 1, wherein:
a plurality of the unreaching periods from before the predetermined period of time are present in the accounting period, and
in the case where the user's use of the electronic apparatus would be otherwise prohibited, the processor permits the use of the electronic apparatus by an amount based on the unused amount from the unreaching period immediately before the predetermined period of time.

10. The control device according to claim 9, wherein the processor permits the use of the electronic apparatus by an amount obtained by multiplying a coefficient less than 1 by the unused amount.

11. A control device comprising:
a processor configured to:
permit a user to use an electronic apparatus,
wherein, in a case where a sum of a cumulative amount of use of the electronic apparatus by the user for a predetermined period of time included in an accounting period and a new amount of use newly instructed by the user exceeds a permitted amount for the predetermined period of time, and in a case where an unreaching period for which the cumulative amount of use does not reach the permitted amount is present in the accounting period and before the predetermined period of time, the processor permits the user to use the electronic apparatus by an amount based on an unused amount, which is a difference between the permitted amount and the cumulative amount of use in the unreaching period.

12. A printing apparatus comprising:
a processor configured to:
prohibit printing performed by a user in a case where, for a predetermined period of time included in an accounting period, a sum of a cumulative number of printed sheets of the user and a new number of sheets to print newly instructed by the user exceeds a permitted number of sheets permitted for the user; and
in a case where the user's printing would be otherwise prohibited, nonetheless permit the user to perform printing based on a number of unused sheets from an unreaching period that is before the predetermined period of time but included in the accounting period, the unreaching period being a period for which the cumulative number of printed sheets does not reach the permitted number of sheets, and the number of unused sheets being a difference between the permitted number of sheets in the unreaching period and the cumulative number of printed sheets in the unreaching period.

13. A printing apparatus comprising:
a processor configured to:
permit a user to perform printing;
wherein, in a case where a sum of a cumulative number of printed sheets of the user for a predetermined period of time included in an accounting period and a new number of sheets to print newly instructed by the user exceeds a permitted number of sheets for the predetermined period of time which is permitted for the user, and in a case where an unreaching period for which the cumulative number of printed sheets does not reach the permitted number of sheets is present in the accounting period and before the predetermined period of time, the processor permits the user to perform printing based on a number of unused sheets, which is a difference between the permitted number of sheets and the cumulative number of printed sheets in the unreaching period.

* * * * *